United States Statutory Invention Registration [19]

[11] Reg. Number: H915

Gibbs [43] Published: May 7, 1991

[54] CONTROLLED MACROPOROUS COPOLYMER PROPERTIES BY REMOVAL OF IMPURITIES IN THE DILUENT

[76] Inventor: Marylu B. Gibbs, 2375 Deer Valley Rd., Midland, Mich. 48640

[21] Appl. No.: 402,571

[22] Filed: Sep. 5, 1989

Related U.S. Application Data

[63] Continuation-in-part of Ser. No. 161,271, Feb. 19, 1988, abandoned, which is a continuation-in-part of Ser. No. 757,709, Jul. 22, 1985, abandoned.

[51] Int. Cl.[5] ..... C08J 5/20

[52] U.S. Cl. ..... 521/25

[58] Field of Search ..... 424/70; 521/25

[56] References Cited

U.S. PATENT DOCUMENTS

| | | | |
|---|---|---|---|
| 3,679,645 | 7/1972 | Host | 526/70 |
| 3,969,091 | 7/1976 | Tegge et al. | 526/70 |
| 4,224,415 | 9/1980 | Neitzne et al. | 521/38 |
| 4,250,270 | 2/1981 | Farrar | 525/54 |
| 4,463,164 | 7/1984 | Patton et al. | 528/212 |

*Primary Examiner*—Robert L. Stoll
*Assistant Examiner*—Cynthia Harris

[57] ABSTRACT

Macroporous copolymer particles are prepared via a process wherein phase separating diluent is removed from copolymer particles and isolated (e.g., by distillation). The isolated diluent is purified by eluting the diluent through a column containing a purification agent such as alumina. The recycled diluent can be employed in the further preparation of macroporous copolymer particles.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTROLLED MACROPOROUS COPOLYMER PROPERTIES BY REMOVAL OF IMPURITIES IN THE DILUENT

CROSS-REFERENCE TO RELATED APPLICATION

This is a continuation-in-part of copending U.S. application Ser. No. 07/161,271, filed Feb. 19, 1988, now abandoned, which was a continuation-in-part of U.S. application Ser. No. 757,709, filed July 22, 1985, now abandoned.

BACKGROUND OF THE INVENTION

This invention relates to a process for manufacturing macroreticular crosslinked copolymer particles, wherein the resulting copolymers are substantially consistent from batch to batch in pore size and porosity. These copolymer particles are capable of being converted into ion exchange resins.

Polymeric ion exchange resins in the form of spheroidal beads are used in many applications as chelating resins and as anion or cation exchangers. Of particular interest are those resins prepared from macroporous copolymer particles (i.e., copolymer particles having a macroreticular character). Such copolymer particles are typically prepared by suspending a suspension polymerizable monomer and crosslinking agent in a reaction medium in the presence of a diluent in which the monomers are soluble, but the copolymer prepared therefrom is not. During polymerization, the copolymers phase separate and agglomerate from the diluent phase. Thus, spaces or channels left between the precipitated copolymer agglomerates form the pores of the macroporous particles. The diluent which can remain in the pores of the copolymer particle is typically removed by techniques such as steam distillation.

In commercial processes, after the macroporous copolymer particles are polymerized and separated from the diluent, the diluent is recycled. The problem with the prior art is that the quality of the macroporous copolymer particles varies a great deal. Therefore, it would be highly desirable to provide a process for preparing copolymer particles having a macroreticular character, which process is capable of producing copolymer particles that exhibit high quality consistently.

Contrastingly from these commercial processes, we have discovered that as recycled diluent is employed in the preparation of further amounts of macroporous copolymer particles, the diluent may become contaminated. We have also discovered that this change in diluent purity can result in the preparation of macroporous copolymer particles which exhibit significant differences in particle porosity.

SUMMARY OF THE INVENTION

The present invention is an improvement process for manufacturing macroreticular crosslinked copolymer particles capable of being converted into ion exchange resins, where the resulting copolymer particles are substantially consistent from batch to batch in pore size and porosity.

The copolymer particles are prepared by polymerizing under suspension polymerization conditions a first monomer mixture of a monoethylenically unsaturated monomer and a polyethylenically unsaturated monomer, in the presence of an inert diluent in which the monomer mixture is soluble and the prepared copolymer particles are insoluble, thereby preparing a first batch of macroreticular crosslinked copolymer particles and then recycling the diluent. However, prior to recycling the inert diluent from the first batch to a second batch monomer mixture, the inert diluent is removed and purified, whereby the resulting macrorecticular crosslinked copolymer particles produced in the second batch are substantially consistent in pore size and porosity with the first batch. By purifying the diluent, the copolymer particles have properties which are consistent in numerous batches.

The process of this invention allows the skilled artisan to reemploy diluent numerous times in the preparation of macroporous copolymer particles. Thus, the process provides for the more efficient use of diluent, which diluent is essentially free of species which adversely affect copolymer particle porosity. When such copolymer particles are converted to ion exchange resins, such resins exhibit consistent water retention capacity and ion exchange capacity.

DETAILED DESCRIPTION OF THE INVENTION

The monomers useful in the preparation of the copolymer particles are advantageously suspension polymerizable ethylenically unsaturated monomers. Such suspension polymerizable monomers are well known in the art and reference is made to *Copolymer Processes*, edited by Calvin E. Schildknecht, published in 1956 by Interscience Publishers, Inc., New York, Chapter III, "Polymerization in Suspension" by E. Trommsdoff and C. E. Schildknecht, pp. 69–109 for purposes of illustration. In Table II on pp. 78–81 of Schildknecht are listed diverse kinds of monomers which can be employed in the practice of this invention. Suitable monoethylenically unsaturated monomers and polyethylenically unsaturated monomers useful in the practice of this invention are also disclosed in U.S. Pat. No. 4,419,245; which is incorporated herein by reference. Of such suspension polymerizable monomers, of particular interest herein are the water-insoluble monomers including the monovinylidene aromatic such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatic such as divinylbenzene, divinyltoluene, divinyl xylene, divinyl naphthalene, trivinylbenzene, divinyl diphenyl ether, divinyl diphenyl sulfone and the like; esters of $\alpha,\beta$-ethylenically unsaturated carboxylic acids, particularly acrylic or methacrylic acid, such as methyl methacrylate, ethyl acrylate, diverse alkylene diacrylates and alkylene dimethacrylates, and mixtures of one or more of said monomers. Of said monomers, the monovinylidene aromatics, particularly styrene or a mixture of styrene with a monoalkyl substituted styrene; the polyvinylidene aromatics, particularly divinylbenzene; esters of $\alpha,\beta$-ethylenically unsaturated carboxylic acids, particularly methyl methacrylate or mixtures containing methyl methacrylate, particularly a mixture of styrene and divinylbenzene or styrene, divinylbenzene and methyl methacrylate are preferably employed herein.

Preferably, the initiator, useful herein, is a conventional chemical initiator useful as a free radical generator in the polymerization of ethylenically unsaturated monomers. Representative of such initiators are UV radiation and chemical initiators including azo compounds such as azobisisobutyronitrile; peroxygen compounds such as benzoyl peroxide, t-butyl peroctoate, t-butyl perbenzoate and isopropylpercarbonate; and the like. Several catalysts are disclosed in U.S. Pat. Nos. 4,192,921; 4,246,386; and 4,283,499 and can be employed herein. The initiator is employed in an amount sufficient to cause the copolymerization of the monomeric components in the monomer mixture. Such amount will generally vary depending on a variety of factors including the type of initiator employed, and the type and proportion of monomers in the monomer mixture used herein. Generally, the initiator is employed in amounts from about 0.02 to about 1, preferably about 0.05, weight percent based on the total weight of the monomer mixture.

The monomers are advantageously suspended, using relatively high agitation rates, in a suitable suspending medium such as water or other aqueous liquid. Suspending agents useful herein are those materials which assist in maintaining a more uniform dispersion of the droplets in the aqueous liquid. Although the suspending agents most advantageously employed herein are dependent on the type and amount of monomers employed in preparing the droplets, in general, suspending agents conventionally employed hereto in the suspension polymerization of mono- and polyethylenically unsaturated monomers are advantageously employed. Representative of such suspending agents are gelatin, polyvinyl alcohol, sodium methacrylate, magnesium silicate, sodium cellulose glycolate, hydroxyethylcellulose, methylcelluloses, carboxymethylmethylcellulose, and the like. Suitable suspending agents are disclosed in U.S. Pat. No. 4,419,245.

While the amount of the suspending medium (e.g., aqueous phase) advantageously employed herein, will vary depending on the type and amount of the suspending agent and the amount of monomer, in general, the suspending medium is employed in amounts from about 30 to about 70, preferably from about 40 to about 60, weight percent based on the weight of the monomer mixture.

The copolymer particles can be prepared using a wide variety of techniques known in the art. Conventional batch suspension polymerization techniques for preparing macroporous copolymer particles can be employed. Also useful are those polymerization techniques described in U.S. Pat. No. 4,419,245.

Phase separating organic materials (i.e., diluent), which are necessary herein, are preferably solvents for the monomer, but an agent which does not dissolve the copolymer. The phase separating organic material is inert in that it does not react with the monomers (with which it is soluble), the copolymers (with which it is insoluble), or the suspending medium. Generally, organic materials having boiling points greater than about 60° C. are employed. Suitable phase separating organic materials include aromatic hydrocarbons, aliphatic hydrocarbons and halogenated hydrocarbons. Examples include iso-octane, hexane, benzene, toluene, xylene, chlorobenzene, ethylene dichloride, ethylene dibromide, and the like, as well as those similar materials disclosed in U.S. Pat. No. 3,176,482. The amount of phase separating organic material which is employed can vary and can range from about 10 to about 60 percent, based on the weight of the organic material and monomer employed in the initial suspension mixture. By the term "diluent" is meant phase separating organic materials.

By the term "functionally effective amount of diluent" is meant that total amount of fresh diluent plus recycled diluent necessary for further preparation of copolymer particles having a macroreticular character. Typically, the added amount will be enough to provide essentially that total amount of diluent which was originally employed when consecutively preparing the same copolymer. However, that added amount can vary if a different copolymer is prepared in a subsequent run with the recycled diluent.

Polymerization conditions usually require agitation of the suspension at a rate which can vary depending upon factors such as the size of the reaction vessel while heating the mixture at a suitable temperature, preferably at about 75° to about 85° C. The polymerization conditions are continued until polymerization of monomer is essentially complete. The reaction can be finished by raising the temperature of the reaction mixture.

The size of the copolymer particles or beads of this invention can vary and is advantageously in the range from about 50 to 2000 microns (μm), preferably from about 200 to 1200 μm. Control of the size of the beads is achieved primarily by controlling the agitation rate, suspending agent, and the amount of monomers employed.

The process of this invention comprises the removal of the diluent from the copolymer particles using techniques such as distillation, and in particular, steam distillation. The diluent typically is removed and contains various species which can hinder properties of products prepared in further polymerization processes. In addition, the amount of diluent which is recovered is typically less than that amount which has previously been employed. Therefore, it is desirable to provide a further amount of fresh diluent to the diluent which was previously employed (i.e., the recycled diluent). However, impurities which are present in such a recycled diluent can be removed by subjecting the recycled diluent to a purification treatment.

Purification treatment comprises a treatment which removes impurities, such as reducible impurities, from the diluent. An example of a purification treatment involves contacting the diluent with at least a purifying amount of an agent such as alumina, silica gel, molecular sieves, and other such types of materials; particularly useful, are those high surface area agents which can absorb and/or adsorb impurities from the diluent.

The amount and type of purifying agents depend upon a variety of factors such as the rate at which diluent is being treated and the amount and types of impurities which are present in the diluent. For example, a column containing about 18 grams of alumina at a height of 2 inches can be used in treating about 7.5 liters of hydrocarbon diluent at a flow rate of 4 ml/minute. If desired, the column containing alumina can be recycled for further use by elution with methanol.

The copolymer particles or beads are converted to anion or cation exchange beads using techniques well known in the art for converting crosslinked addition copolymers of mono- and polyethylenically unsaturated monomer to such resins. See, for example, U.S. Pat. No. 4,444,961.

The following example is given to further illustrate the invention and should not be construed as limiting its scope. All parts and percentages are given by weight unless otherwise indicated.

EXAMPLE 1

Into a stainless steel reactor are charged an aqueous phase and a monomer phase comprising a major amount of styrene, a monomer amount of divinylbenzene and a hydrocarbon diluent. The monomers are polymerized using a free-radical catalyst mixture in the presence of effective amounts of suspending agent and latex inhibitor at a temperature of about 80° C. for 7 hours and finishing at 110° C. for 5 hours. Agitator rates during polymerization are 220 rpm in order to obtain copolymer particles having a size range between 20 mesh and 60 mesh.

After polymerization is complete the copolymer beads are separated from the liquid phase by filtration and washed with water. The copolymer particles are slurried in water in a two liter glass flask equipped with an agitator means, a thermometer in a vapor line, a condenser means and a receiving means. Steam is sparged into the bottom of the flask. At about 70° C. the hydrocarbon diluent evaporates off and is collected after condensation. The temperature is allowed to rise until most of the diluent is removed from the copolymer particles and collected. The copolymer particles are filtered and dried.

The collected hydrocarbon diluent is passed through a 12 inch by 0.5 inch column of alumina at a flow rate of about 14 ml/minute. Polarographic analysis of the treated diluent indicates that essentially all of reducible species impurities are removed.

For illustration purposes the treated diluent is employed to prepare macroporous copolymer particles as described hereinbefore. The treated bulk densities of the copolymer particles so prepared is 0.349 g/ml. The treated bulk density of copolymer particles which are similarly prepared but using recycled but untreated diluent is 0.357 g/ml. The treated bulk density of copolymer particles prepared using fresh hydrocarbon diluent is about 0.344 g/ml. The treated bulk density values are determined by swelling the particles in toluene, exchanging the toluene with iso-octane in order to precipitate the copolymer in the swollen state. The iso-octane is then removed and the density of the dry copolymer is determined. The value is the treated bulk density.

To the treated diluent is added fresh hydrocarbon diluent in order to provide the desired amount of diluent for further preparation of macroporous resin.

What is claimed is:

1. In a process for recycling an inert diluent used for preparing macroreticular crosslinked copolymer particles, wherein the copolymer particles are prepared by polymerizing under suspension polymerization conditions a first monomer mixture of a monoethylenically unsaturated monomer and a polyethylenically unsaturated monomer, in the presence of an inert diluent in which the monomer mixture is soluble and the prepared copolymer particles are insoluble, thereby preparing a first batch of macroreticular crosslinked copolymer particles, and then recycling the inert diluent from the first batch to a second batch monomer mixture, the improvement comprises purifying the inert diluent before the recycling step, whereby the resulting macrorecticular crosslinked copolymer particles produced in each batch are substantially consistent in pore size and porosity.

2. The process of claim 1, wherein said purification treatment comprises contacting said diluent with at least a purifying amount of alumina, silica or molecular sieves.

3. The process of claim 1, wherein said diluent is removed from said copolymer particles and isolated using distillation techniques.

4. The process of claim 1, wherein said diluent is a hydrocarbon.

5. The process of claim 1, wherein the monomers comprise monovinylidene aromatics, polyvinylidene aromatics and $\alpha,\beta$-ethylenically unsaturated carboxylic acids.

6. The process of claim 1, wherein the monomers are selected from the group consisting of styrene, divinylbenzene and methyl methacrylate.

7. The process of claim 1, wherein an initiator is employed in the polymerization of the monomers.

8. The process of claim 7, wherein the initiator is an azo compound.

9. The process of claim 8, wherein the initiator is azobisisobutyronitrile or peroxygen compound.

10. The process of claim 9, wherein peroxygen compound is benzoyl peroxide, t-butyl peroctoate, t-butyl perbenzoate or isopropylpercarbonate.

11. The process of claim 7, wherein the initiator is employed in amounts from about 0.02 to about 1 weight percent based upon total weight of the monomer mixture.

12. The process of claim 11, wherein the initiator is employed in an amount sufficient to yield about 0.05 weight percent based upon total weight of the monomer mixture.

* * * * *